March 10, 1936.  A. B. MUELLER  2,033,584

MACHINE FOR STUFFING UPHOLSTERY PIPING

Filed Nov. 19, 1930  7 Sheets-Sheet 4

Inventor
Albert B. Mueller
By Fisher, Clapp, Soans & Pond, Attys.

Patented Mar. 10, 1936

2,033,584

UNITED STATES PATENT OFFICE 2,033,584

MACHINE FOR STUFFING UPHOLSTERY PIPING

Albert B. Mueller, Chicago, Ill., assignor, by mesne assignments, to Scott Patents Corporation, Chicago, Ill., a corporation of Illinois Application November 19, 1930, Serial No. 496,613

37 Claims. (Cl. 226—44)

The subject matter of the present invention is a machine for stuffing or padding upholstery piping with stuffing strips or bats of cotton, felt, or other stuffing material. The present machine is of that type employing a plurality of parallel tubes over which the piping strip is drawn and mechanism for feeding the stuffing strips into and through the tubes, the piping being gradually withdrawn from the tubes as the filling proceeds.

A general object of the invention is to provide an improved, fully automatic machine for stuffing upholstery piping; more specific objects being to provide improved feeding mechanism for passing the stuffing strips into the tubes, to provide an improved mechanism for advancing the stuffing strips through the tubes, to provide automatic mechanism controlling the withdrawal of the piping as it is being filled, to provide an improved mechanism for severing the stuffing strips when the piping is filled, and to provide an improved mechanism for automatically arresting the operation of the machine simultaneously with the completion of each stuffing operation.

Other objects and attendant advantages of the invention will be apparent to persons skilled in the art as the same becomes better understood by reference to the following detailed description, taken in connection with the accompanying drawings, wherein I have illustrated one practical and efficient embodiment of the principle of the invention, and in which—

Fig. 16 is an enlarged longitudinal section taken on the line 16—16 of Fig. 15, and showing the strip breaking or severing devices in working position, and also showing the automatic stop mechanism for arresting the movement of the machine.

Figs. 18 and 19 are transverse sections taken on the lines 18—18 and 19—19, respectively, of Fig. 15.

Fig. 20 is a perspective detail of a coupling section of the feeder plate drive shaft.

Fig. 22 is a longitudinal section on line 22—22 of Fig. 15.

Figures 1, 6, 7, 8:
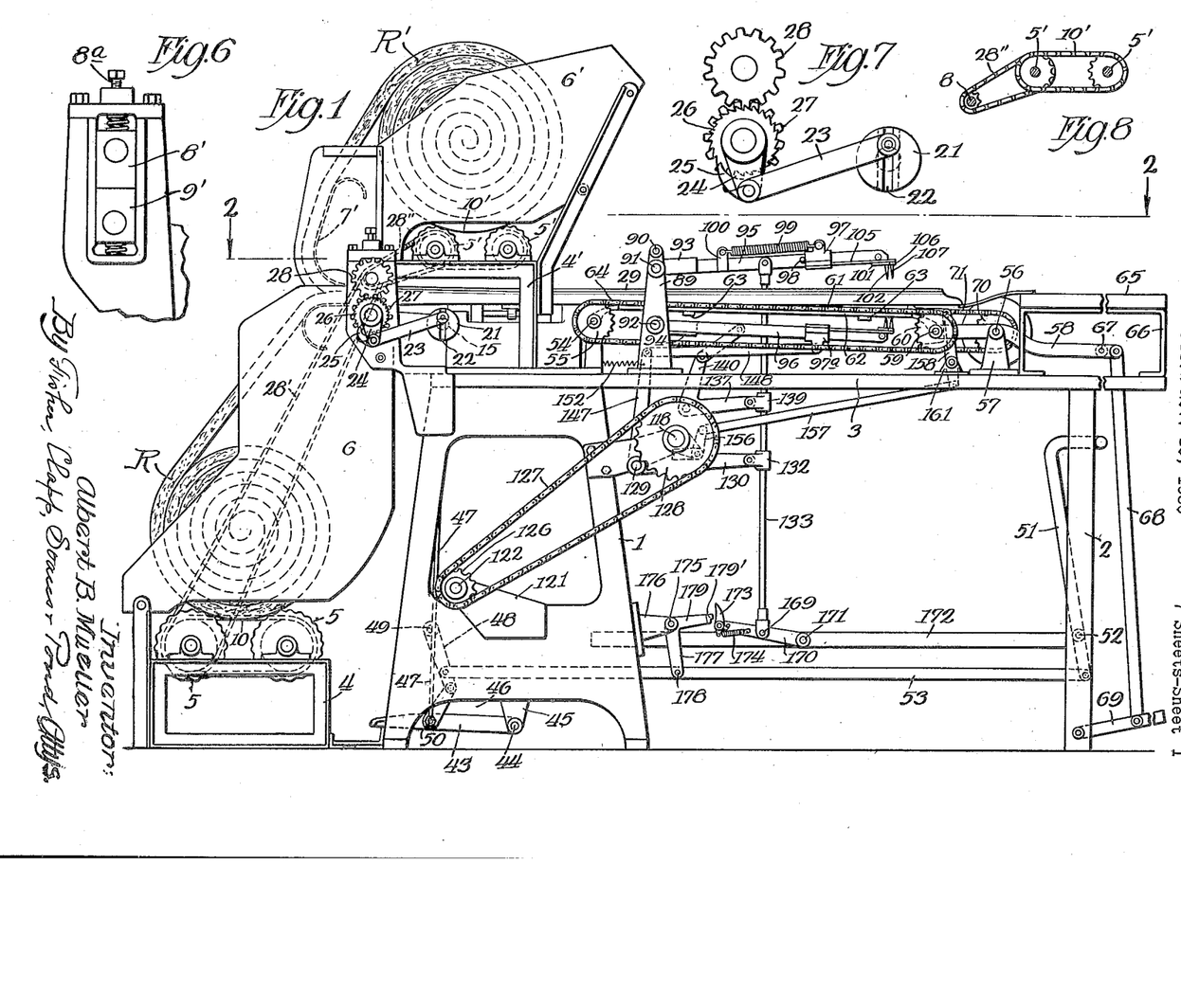
Fig. 1 is a side elevation of the machine.
Fig. 6 is a detail end elevation of one of the feed roll journal mountings.
Fig. 7 is a detail elevation of the feed roll driving mechanism.
Fig. 8 is a detail elevation of the chain and sprocket drive from one of the feed rolls to the stuffing roll revolving rollers.
Figure 2:
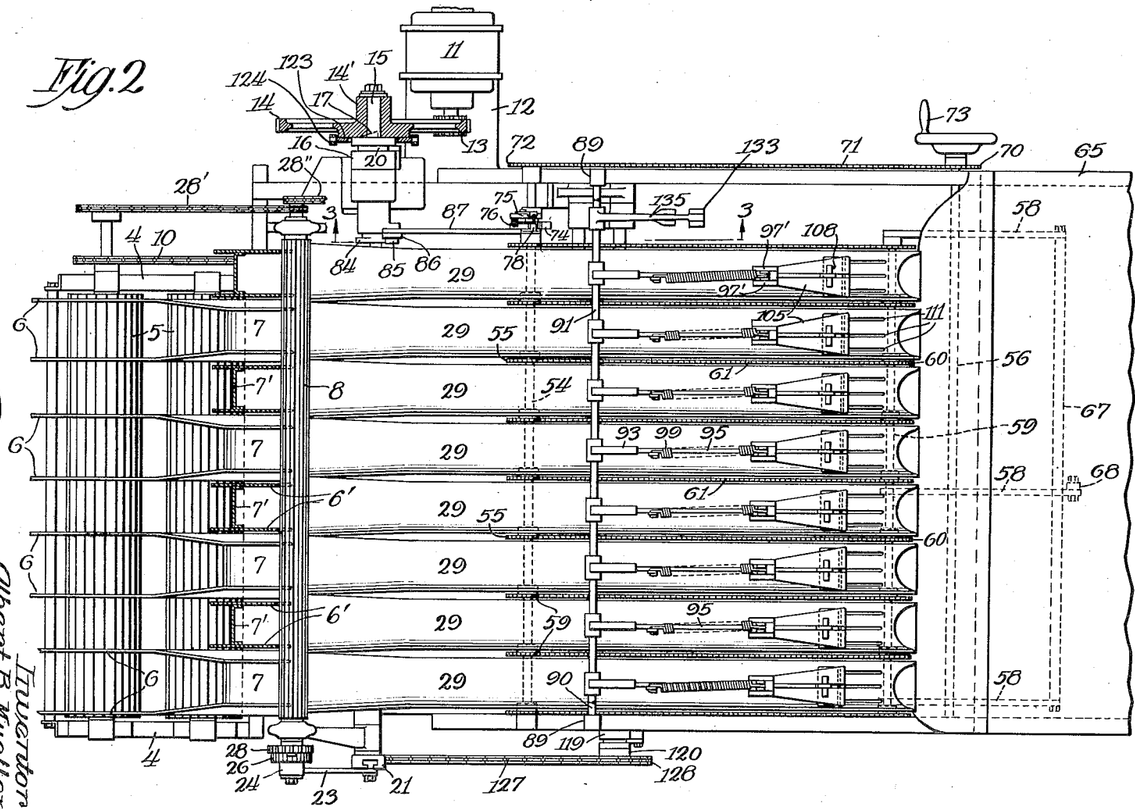
Fig. 2 is a top plan, partly in horizontal section, on the line 2—2 of Fig. 1.

Referring to the drawings, the general supporting frame work of the machine comprises front and rear standards 1 and 2, and a horizontal table or platform 3 supported thereon. In front of the machine are low rectangular frames 4 (Fig. 1) on and between which are journaled a pair of intergeared corrugated rollers 5, and superposed on the frame 4 is a stock hopper comprising a plurality of spaced pairs of upright partition plates 6 (Fig. 2). Between the plates of each pair rests a roll R of stuffing stock, which is supported by the rollers 5 and slowly unwound by the latter during the operation of the machine. On the front end of the platform 3 are frames 4', functionally similar to the frames 4 and having mounted thereon a pair of intergeared corrugated rollers 5' adapted to similarly support and unwind rolls R' of stuffing stock, similar to the rolls R, the rolls R' being likewise supported laterally between vertical partition plates 6'. The rolls R' are disposed in alternating relation with the rolls R, the purpose of this arrangement being to enable the machine to operate upon a greater number of rolls, for a given width of the machine, than would be possible were the rolls all mounted in a single transverse row. By reference to Fig. 12 it will be observed that the strips from the lower rolls are guided upwardly over a curved guide plate 7 into the nip of a pair of corrugated feed rollers 8 and 9, and the strips from the upper rolls R' are guided downwardly over curved guide plates 7' into the nip of the feed rollers 8 and 9. By reference to Fig. 2 it will be seen that the supporting and unwinding rolls 5 are geared for equal rotation in the same direction by a chain and sprocket connection 10, and by reference to Figs. 1 and 8 it will be seen that the supporting and unwinding rolls 5' are similarly operated by a chain and sprocket connection 10'.

Describing the operation of the feed rollers 8 and 9, 11 designates a source of power herein shown as an electric motor mounted on a bracket 12 attached to one of the frame uprights 1. A pinion 13 on the armature shaft of the motor engages and drives a gear 14 that is loose on one end of a cross shaft 15, the hub 14' of the gear 14 constituting one member of a clutch; the other member 16 of the clutch being fast on the shaft 15. The clutch herein indicated is of an old and well known type wherein the clutch member 14' is formed with a notch 17 in its face, and the associated clutch member 16 carries a spring-pressed sliding pin 18 (Fig. 3) adapted to enter the notch, the pin being retracted to open the clutch by a tongue 19 arranged to extend within an annular groove 20 in the clutch member 16 and having a beveled free end that engages a similarly beveled slot in the pin 17. On the other end of the shaft 15 is a crank disc 21 (Figs. 1 and 7) having a transverse T-groove 22, in which is connected, at an adjustable distance from the axis of the crank disc, a link 23 that is pivotally connected at its other end to the free end of a radius arm 24 loose on the spindle of the lower feed roller 9. The arm 24 carries a spring pressed pawl 25 that intermittently rotates the lower feed roller 9 through a ratchet 26 fast on the latter; the two feed rollers being inter-connected by pinions 27 and 28. By varying the throw of the crank disc 21, the rate of feed may obviously be varied. By a sprocket and chain connection 28' (Figs. 1 and 2) the drive of the rolls 5 is effected from the spindle of the feed roller 8, and by a similar sprocket and chain connection 28" (Figs. 1 and 8) the drive of the rolls 5' is effected from the spindle of the feed roller 8. As shown in Fig. 6, the feed rollers 8 and 9 are yieldingly pressed together by spring pressed slidable bearing blocks 8' and 9', in which the pintles of said rolls are journaled, the pressure being adjustable by a screw 8ª.

The feed rollers 8 and 9 compress the stuffing strips and advance the latter into the receiving ends of a group of parallel tubes 29 of a generally oval cross section, through which tubes the stuffing strips are given a step by step advance movement by means later described. Referring to Fig. 2 it will be seen that the tubes 29 are narrowly spaced except at their receiving portions, which latter are tapered or widened both horizontally and vertically (see Fig. 12) so as to gradually compress the stuffing strips as they are forced into the tubes. It is also noted that, as shown in Fig. 2, each pair of the partition plates 6 and 6' adjacent the guide plates 7 and 7' and the feed rolls 8 and 9, are contracted, (see Figs. 2 and 12), so that the bats or strips of stuffing material are properly delivered into the inlet or receiving ends of the tubes 29.

Referring to Figs. 5, 15, 18 and 19, each tube 29 is attached at its bottom wall to, and rests upon, a pair of transverse yokes 30, which yokes are supported at their ends on a pair of rods 31 that in turn are mounted in the end walls of a hollow casting 32 that rests on the frame platform 3. On the bottom wall of each tube 29 there are two parallel longitudinal rows of upwardly punched and forwardly pointing teeth 33. Slidable on the bottom wall of each tube 29 is a reciprocable feeder plate 34 that is formed throughout approximately its full length with a pair of longitudinal slots 35 through which the stationary teeth 33 on the bottom wall of the tube project. This feeder plate is formed, in the instance shown, with three parallel rows of upwardly and forwardly bent teeth 36, the central row lying between and the side rows on the outer sides of the rows of teeth 33, as clearly shown in Fig. 15. As the plate 34 is moved forwardly, the stuffing strip in the tube is advanced with the plate by the teeth 36, and as the plate 34 is retracted for a fresh hold on the stuffing strip, the teeth 33 prevent the strip from moving backwardly with the plate.

Figures 5, 12, 13, 14:
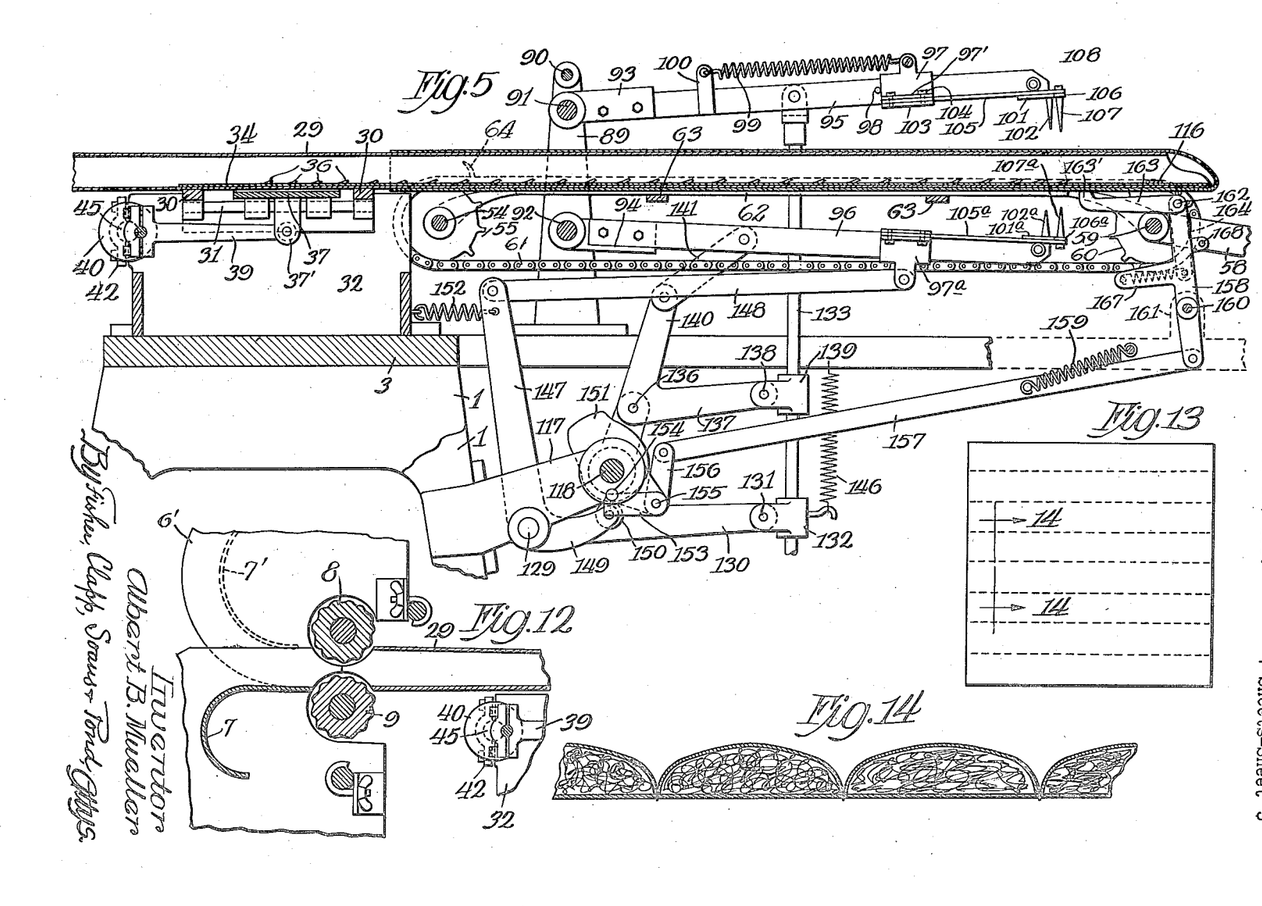
Fig. 5 is a vertical longitudinal section taken on the line 5—5 of Fig. 4.
Fig. 12 is an enlarged vertical section through the stuffing strip feed rolls and guide tubes.
Fig. 13 is a top plan view of a stuffed piping strip.
Fig. 14 is an enlarged transverse section of a stuffed piping strip taken on the line 14—14 of Fig. 13.
Figures 9, 10, 11:
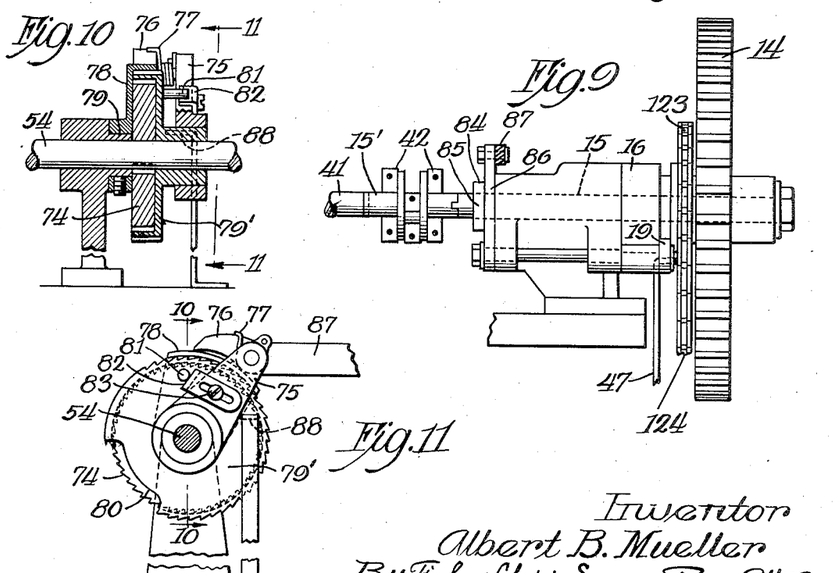
Fig. 9 is a side elevation, partly in section, on the line 9—9 of Fig. 3, of the clutch-controlled transmission mechanism adjacent to the motor.
Fig. 10 is an enlarged vertical section on the line 10—10 of Figs. 3 and 11 through a device by which the withdrawal movement of the piping strip during the stuffing operation is controlled.
Fig. 11 is a side elevation of Fig. 10, viewed from the right of the latter figure.
Figures 10, 15:
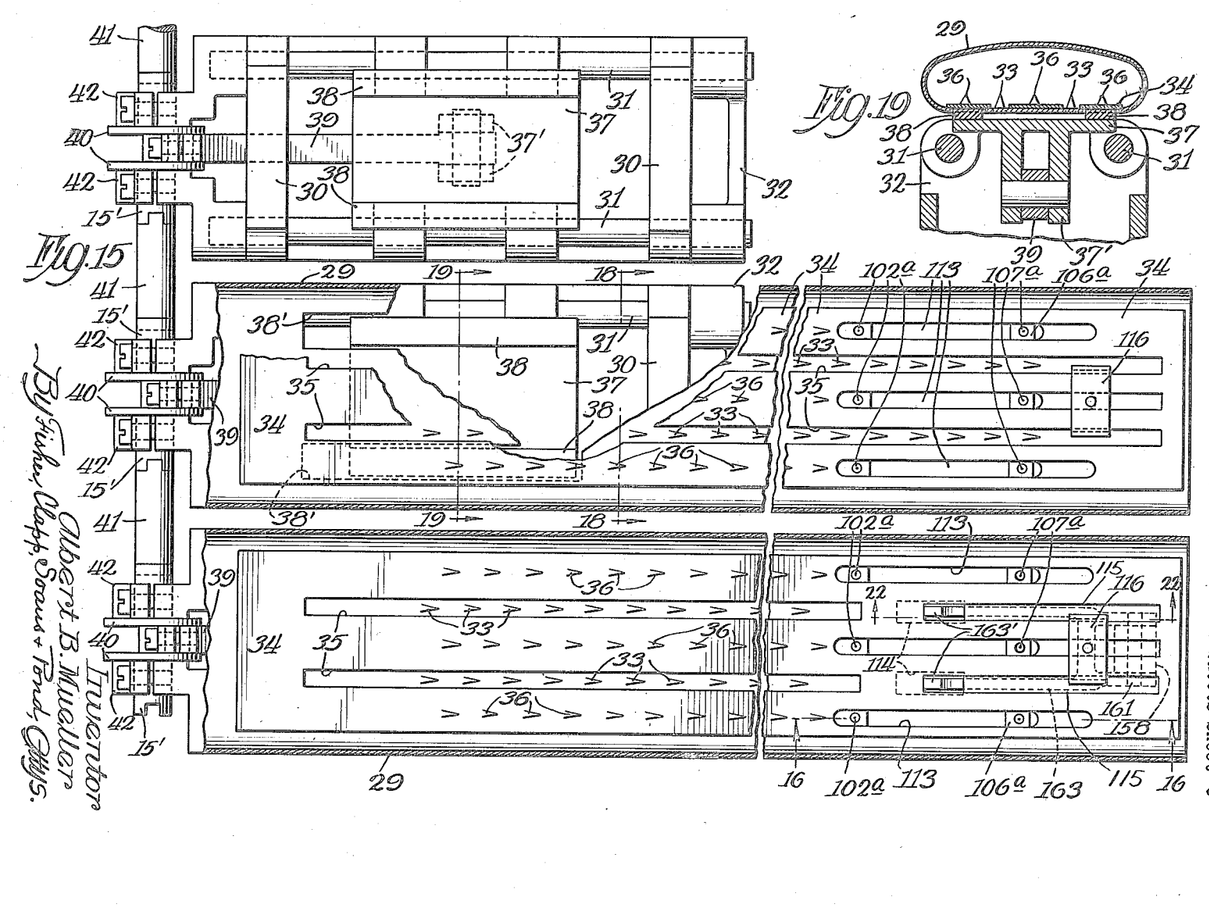
Fig. 15 is an enlarged sectional plan of a pair of tubes and an adjacent feeder plate actuating cross-head, more particularly showing the longitudinally slotted reciprocating feeder plates on the bottoms of said tubes, and associated teeth on said plates and said tube bottoms for effecting the step by step movement of the stuffing strips through the tubes.
Figures 16, 18, 20, 22:
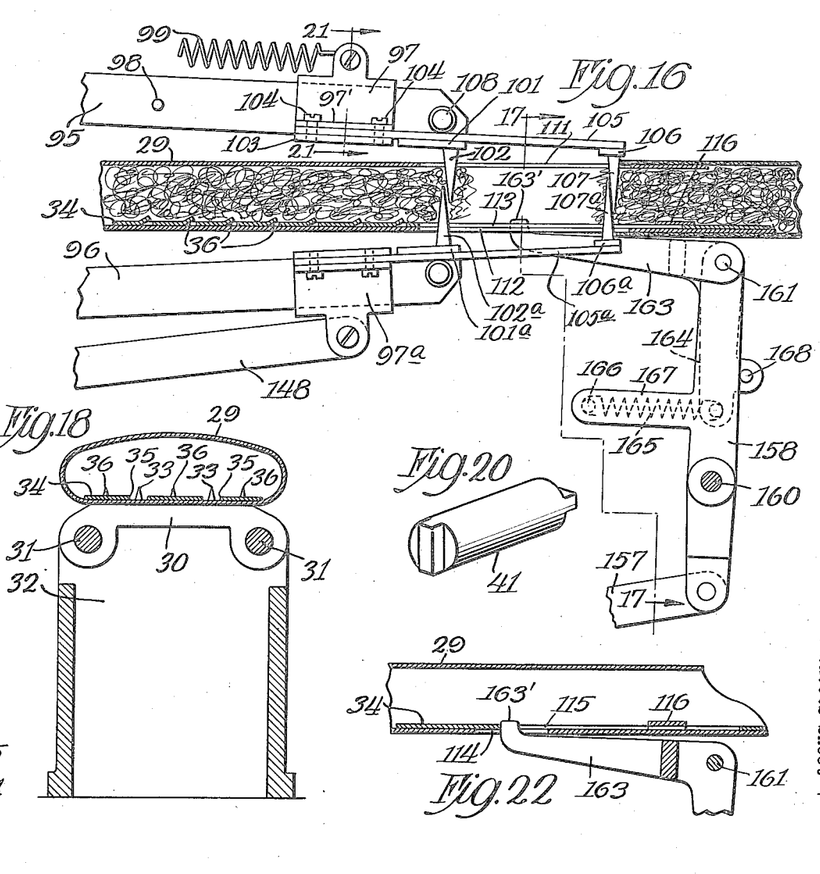

Describing next the means for reciprocating the feeder plates 34, slidable on the rods 31 is a cross head 37 (Figs. 5, 15 and 19), said cross head carrying on its upper side a pair of longitudinal ribs 38 that extend through longitudinal side slots 38' in the bottom wall of the tube 29 and are soldered or otherwise secured to the side portions of the plate 34. On the under side of the cross head 37 is a forked depending lug 37', to which is pivotally connected one end of a connecting rod 39 (Fig. 5). The several connecting rods 39 are operated by cranks 40 that, as shown in Figs. 9 and 15, are formed on the drive shaft 15. The shaft 15 is preferably formed in cranked sections 15', the several sections being connected by tongued couplings 41 (Fig. 20). These couplings, which may be made in varying lengths, permit the several cranked sections 15' of the shaft 15 to be spaced closer together or farther apart, to accommodate the drive to varying widths of tubes. The shaft sections turn in spaced journal bearings 42 on the rear ends of the castings 32, and are driven through the clutch previously described. This clutch is manually controlled by devices shown in Figs. 1 and 3, wherein 43 designates a pedal lever pivoted at 44 to a bracket 45 on the frame member 1 and normally upheld by a pull spring 46. From the pedal 43 there extends upwardly a rod 47 that is connected to the clutch throw-out tongue 19. In the raised position of the pedal lever 43, shown by full lines in Fig. 3, the clutch is thrown out. By depressing the pedal lever 43, the clutch-controlling tongue 19 is retracted and the clutch automatically couples, and at the same time the pedal lever is locked in lowered position by the straightening of a toggle 48, one arm of which is pivoted at 49 to the frame while the other arm is pivoted at 50 to the pedal lever. The clutch may be manually operated from the other end of the machine through the agency of a hand lever 51 (Fig. 1) pivoted at 52 on the frame upright 2, and a link 53 connecting the lower end of lever 51 with the toggle 48. The link 53 is also automatically actuated through mechanism hereinafter described, to throw out the clutch and arrest the operation of the machine.

The piping, such as shown in Figs. 13 and 14, is manually drawn onto the tubes 29 by the following described mechanism. 54 designates a shaft journaled beneath and transversely of the tubes 29 and equipped with sprocket wheels 55 thereon that lie in the vertical planes of the narrow spaces between the sides of the tubes 29. Slightly in rear of the rear ends of the tubes is a transverse shaft 56 (Figs. 1 and 2) journaled in brackets 57, and pivoted on shaft 56 on opposite sides and mid-width of the machine are three levers 58, in and between the forwardly extending arms of which is journaled a shaft 59 carrying a series of sprocket wheels 60 disposed in alignment with the sprocket wheels 55. Trained over the sprockets 55 and 60 are sprocket chains 61, and the upper laps of said chains are supported by a skeleton framework comprising longitudinal strips 62 underlying the respective chains 61 and transverse underlying strips 63 connecting the longitudinal strips 62. The longitudinal strips 62 are mounted at their ends on the shafts 54 and 59. On each chain 61 is a hook 64 that pierces the lower side of the piping at a point between adjacent pleats or flutes. The rear arms of the levers 58 extend beneath a platform 65 mounted on supporting frames 66 at the tail end of the machine, which platform supports the filled piping as it passes off the tubes and also supports the empty piping during its introduction to the tubes. The rear arms of the levers 58 are connected by a rod 67, and the rear end of the intermediate lever 58 is connected by a link 68 to a foot lever 69. By depressing the foot lever 69, the rear ends of the sprocket chains are raised to bring the hooks 64 into position for hooking into the piping. On one end of shaft 56 is a sprocket wheel 70 (Fig. 2) connected by a chain 71 to a sprocket wheel 72 on the corresponding end of sprocket shaft 54; and on shaft 56 is a crank 73, by turning which the chains 61 are manually operated to draw the pleated upholstery material or piping onto the tubes. At the time when a filled piping section is removed and an empty piping section is to be applied, the hooks 64 are located at the tail end of the machine, so that the operator steps on the lever 69, engages the front edge of the piping strip with the hooks, and then turns the crank 73 until the pipes of the strip have been drawn fully onto the tubes 29, as illustrated in Fig. 5.

The piping is gradually withdrawn from the tubes by the thrust of the stuffing strips as the latter are advanced through the tubes by the feed plates 34. The withdrawal is controlled by a mechanism which regulates the extent of intermittent rotation of shaft 54 relatively to the speed of travel of the stuffing strips through the tubes. The speed of travel of the stuffing strips through the tubes is uniform, whereas the rate of travel of the piping strip in its withdrawal may be varied, being retarded when a greater density of the filling material is desired, and accelerated when a lesser density is required.

Describing this mechanism for controlling the withdrawal of the piping, and referring to Figs. 2, 3, 10 and 11, fast on shaft 54 is a ratchet-wheel 74, and loose on the same shaft is a radius arm 75 carrying at its free end a pawl 76 that is urged into engagement with the ratchet wheel by a spring 77. At the beginning of a filling operation, the nose of the pawl 76 at the end of its back stroke rests on the peripheral flange of a segmental shroud member 78 that is adjustably keyed on a boss 79 (Fig. 10) on the shaft bearing. On the opposite side of a ratchet wheel 74 from the shroud member 78 is a circular shroud member 79', the hub of which has a friction fit on shaft 54. The peripheral flange of shroud member 79' covers the teeth of ratchet wheel 74 and underlies the flange of shroud member 78, and is toothed through something more than half its length, and just beyond its toothed portion, relatively to its working direction of rotation, is cut away, as shown at 80, to uncover the teeth of the ratchet wheel 74. On the outer face of shroud member 79' is a pin 81, and on the radius arm 75 is a slotted striker 82 adjustable toward and from pin 81 by a clamp screw 83. The radius arm 75 and pawl 76 are oscillated by the means shown in Fig. 3, comprising a cam 84 on shaft 15, a cam follower 85 on a lever 86, and a link 87 connecting the upper end of lever 86 to the upper end of radius arm 75; the cam 84 being so set as to effect a working stroke of the pawl synchronously with the working strokes of the feeder plates 34.

From the foregoing it will be seen that, with the parts in the position shown in Fig. 11, on the first working stroke of the pawl 76 the striker 82 engaging the pin 81 will advance the shroud 79' through an angular movement equalling the angular movement of the radius arm 75. On the second and following working strokes of the pawl, the latter will advance the shroud 79' to a greater or less extent at each stroke depending upon the angular set of the shroud 78, the latter determining the portion of the forward stroke of the pawl that is effective on the shroud 79' and later on the ratchet wheel 74. The pawl 76 will not begin to turn the ratchet 74 and shaft 54 until the advance end of the cut-out 80 of the shroud comes beneath the nose of the pawl. As soon as or shortly after the pawl has begun to operate on the ratchet 74, through the cut-out 80, further rotation of the shroud 79' under the friction of shaft 54 is arrested by contact of the pin 81 with a fixed stop 88 located in the path of the pin 81.

The reason why the working engagement of the pawl 76 with the ratchet 74 is delayed by the shroud 79' is because the severing of the filling strips, by the mechanism hereinafter described, produces an unfilled gap in the tubes, which is first filled by the further advance of the stuffing strips before the latter strike the outer or closed ends of the pleats of the piping, and during this period no movement of the piping takes place. By setting the shroud 78 so that it will shorten or lengthen the effective strokes of the pawl on the ratchet 74, the rate of movement of the piping is varied relatively to the advance travel of the stuffing strips through the tubes to vary the compactness with which the piping is stuffed by adjusting the striker 82 across the radius arm 75, the time when the pawl will become effective on the ratchet 74 through the cut-out 80 is advanced or retarded relatively to the preliminary advance of the stuffing strips through the tubes. When the rotation of shaft 54 is reversed by the hand cranks 73 in the operation of fitting an empty piping strip onto the tubes, shroud 79' is returned to the position shown in Fig. 11 by the friction thereof on the shaft 54 until the pin 81 engaging the striker 82 arrests further backward rotation of the shroud 79'.

Figure 21:
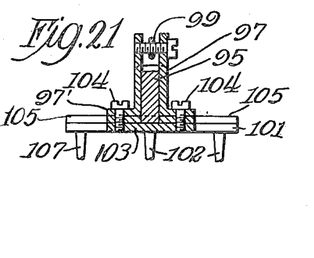
Fig. 21 is a cross section on the line 21—21 of Fig. 16.

Means for severing the formed bats or strips of stuffing material will now be described. 89 designates each of a pair of standards mounted on opposite sides of the platform 3 and connected at their upper ends by a tie rod 90. Journaled in and between these standards 89 are upper and lower rock shafts 91 and 92, fast on which are socket pieces 93 and 94. Attached to these socket pieces are rearwardly extending upper and lower bars 95 and 96 constituting the swinging arms of the severing devices. Straddling the upper arm 95 is a slide 97 normally drawn backwardly against a stop 98 by a pull spring 99 anchored at one end to the slide 97 and at its rear end to a post 100 on the arm 95. Secured to the forward end of the lower edge of the bar 95 is a cross plate 101 carrying a group (herein shown as three) of depending teeth 102. The slide 97 is formed with lateral flanges 97' (see Figs. 16 and 21) to the under side of which flanges are secured, as by an underlying clamp plate 103 and screws 104, a pair of narrow tapered plates 105 (Fig. 2) that straddle the lower edge of bar 95 and slidingly overlie the cross plate 101. Welded or otherwise attached to the under side of the forward ends of the plates 105 is a cross strip 106 from which depend teeth 107 disposed in advance of the teeth 102. Rollers 108 journaled on opposite sides of the tip of bar 95 engage the top surfaces of the plates 105 and prevent the latter from bending upwardly as the teeth 107 exert a push on the filling strip.

Figure 17:
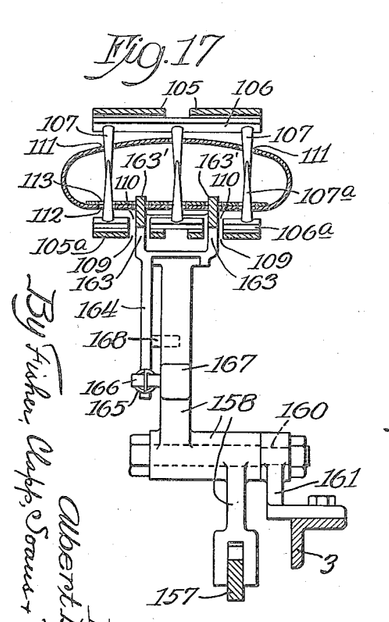
Fig. 17 is a transverse section taken on the line 17—17 of Fig. 16.

The lower bar 96 is equipped with a slide 97$^a$ similar to the slide 97, but positively moved in both directions, as hereinafter described. Across the forward end of bar 96 is attached a cross plate 101$^a$ corresponding to the cross plate 101 and carrying upstanding teeth 102$^a$. To the side flanges of slide 97$^a$ are attached plates 105$^a$ structurally and functionally similar to the plates 105, overlying the forward ends of which is a cross strip 106$^a$ carrying upstanding teeth 107$^a$. The upper and lower sets of teeth above described are so located that when closed on each other, as shown in Figs. 16 and 17, the upper teeth 102 and 107 will overlap the lower teeth 102$^a$ and 107$^a$ just in front of the latter. As shown in Fig. 17, the plates 105$^a$ carried by the bar 96 pertaining to one of the tubes are formed at their forward ends with longitudinal slots 109, and the strip 106$^a$ is also transversely severed in register with the slots 109, to provide clearance for a trip-out member hereinafter described.

The top and bottom walls of the tubes 29 adjacent to their forward or discharge ends, are formed with longitudinal slots 111 and 112 respectively, the former to accommodate the passage of the upper teeth 102, 107, and the latter to accommodate the passage of the lower teeth 102$^a$, 107$^a$; and the feeder plates 34 are formed with similar slots 113 registering with the slots 112. The bottom wall of one of the tubes and its overlying feeder plate are further formed with registering slots 114 and 115 (Fig. 22) to accommodate the trip-out device above mentioned. The forward end of the feeder plate is locked to the bottom wall of the tube and guided in its sliding movement by a keeper 116 soldered to said bottom wall and embracing the portion of the feeder plate between the longitudinal slots 35.

Describing next the actuating mechanism of the arms 95 and 96, journaled in brackets 117 (Fig. 4) attached to the frame uprights 1 is a transverse cam shaft 118. On one end of this shaft is a one-revolution clutch, similar in construction to the main clutch on shaft 15 previously described, and including a driven clutch member 119 fast on the shaft and a driving clutch member 120 loose on the shaft. Journaled in and between brackets 121 (Fig. 3) on the frame uprights 1 is a shaft 122 that is continuously driven from the main gear 14 by a sprocket wheel 123 fast with gear 14, a chain 124, and a sprocket wheel 125 fast on shaft 122. Fast on the other end of shaft 122 is a sprocket wheel 126 (Fig. 1) which, through a chain 127, continuously drives a sprocket wheel 128 fast with the loose member 120 of the clutch. Also journaled in bearing brackets 117, parallel with cam shaft 118, is a shaft 129. Loosely mounted on one end of shaft 129 is an arm 130 (Fig. 3) articulated at 131 to a collar 132 fast on a vertical rod 133 that extends upwardly through a slot in the table 3, and at its upper end is articulated at 134 to an arm 135 fast on the upper rock shaft 91. Pivoted at 136 in an upwardly projecting bearing on one of the brackets 117 is an elbow lever, one arm 137 of which is articulated at 138 to a collar 139 fast on the rod 133, while the other arm 140 of the elbow lever constitutes one link of a toggle, the other link 141 of which is articulated at its upper end at 142 to an arm 143 (Fig. 3) fast on the lower rock shaft 92. Fast on the cam shaft 118 is a cam 144 that, once at each revolution of shaft 118, depresses arm 130 through engagement with a cam follower 145 journaled on the upper side of said arm 130. The downward movement of the arm 130, through the connections last described to the rock shafts 91 and 92, simultaneously rocks said shafts in directions to swing the cutter arms 95 and 96 toward each other and carry the teeth on said arms into the tubes, as shown in Figs. 16 and 17. A pull spring 146 elevates the arm 130 when released by the cam 144, returning the arms 95 and 96 to the spread position shown in Figs. 1 and 5.

As soon as the arms 95 and 96 have been swung inwardly so that the teeth carried thereby penetrate the stuffing strips in the tubes, the slides 97 and 97$^a$ are advanced to sever or break the stuffing strip, as shown in Fig. 16, by the following described mechanism.

Fast on shaft 129 are a group of upwardly extending arms 147, the upper end of each arm being connected by a link 148 to the lower slide 97$^a$. The arm 147 at one side of the machine has an integral arm 149 (Fig. 5) continuous with its lower end in which is journaled a cam follower 150 that is engaged by a cam 151 fast on the opposite end of shaft 118 from cam 144, cam 151 acting just after cam 144 has acted. When the cam 151 depresses the arm 149, the shaft 129 is rocked, and, through the arms 147 and links 148, the several slides 97$^a$ are moved forwardly. Since the teeth 107$^a$ lie directly in front of the teeth 107, the forward movement of slide 97$^a$ carries with it the slide 97 and the teeth 107. This severs and produces a gap in the stuffing strip within each tube, as clearly shown in Fig. 16. The slides 97$^a$ are retracted by a pull spring 152 (Fig. 5) anchored at one end to one of the arms 147 and at its other end to one of the tube supporting castings 32.

Figure 4:
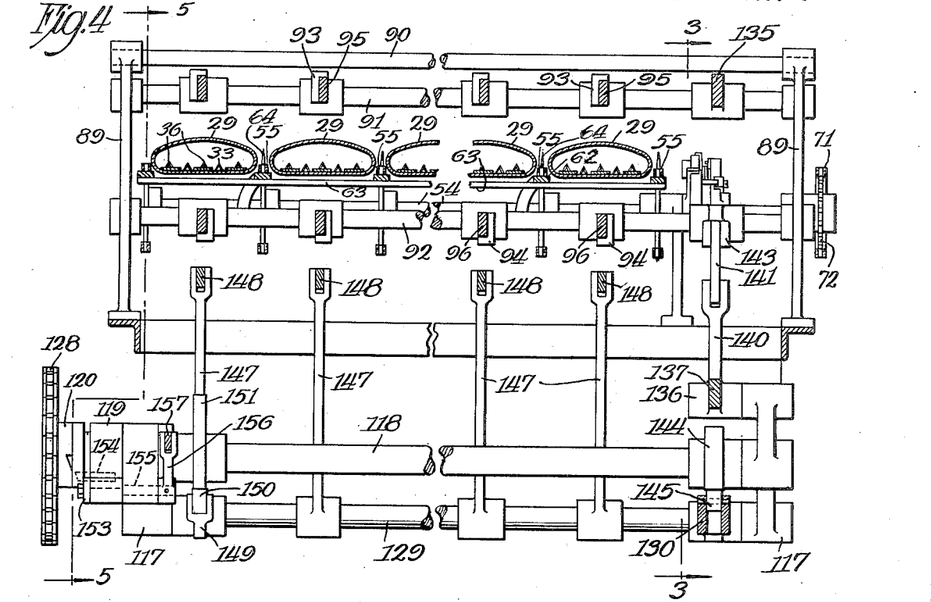
Fig. 4 is a vertical transverse section taken on the line 4—4 of Fig. 3.

The clutch 119, 120, through which the shaft 118 is driven, is normally maintained open or out by means best shown in Figs. 4 and 5, comprising a tongue 153 that enters the groove of the clutch to retract spring pressed clutch pin 154 and is fast at one end on a rock shaft 155, an upstanding arm 156 on the other end of said rock shaft, a link 157 that connects the arm 156 to the lower end of a lever 158, hereinafter referred to, and a pull spring 159 anchored at one end to the link 157 and at its other end to the table 3. This clutch is thrown in to actuate the stuffing strip severing mechanism and then arrest the operation of the machine at a point in the operation of the machine when the pipes of the piping have been filled, and the filled piping is ready to be discharged from the tubes. The throwing in of this clutch is effected by the working stroke of one of the feeder plates 34 acting through a trip device that is controlled by the fabric forming the bottom wall of the piping and enters the path of movement of the feeder plate as soon as permitted by the open edge of the piping passing thereover. Describing this clutch throw-in device, the lever 158 is pivoted at 160 to a bracket 161 on the table 3, and pivoted at 162 on the upper end of lever 158 is an elbow lever, the horizontal limb of which comprises a pair of parallel arms 163 underlying the end portion of one of the tubes 29 and formed on their free ends with upstanding fingers 163' that register with the slots 114 and 115 in the bottom wall of the tube and the feeder plate respectively. To the lower depending arm 164 (Fig. 16) of the elbow lever is connected a pull spring 165 anchored at 166 to the outer end of a lateral arm 167 on the lever 158. The spring 165 urges the fingers 163' upwardly into the tube; but so long as the slots 114 are covered by the fabric, the fingers cannot enter the slots. As soon, however, as the open end of the piping has passed the fingers 163', the latter enters the slots 114 and 115, and on the next forward stroke of the feeder plate 34 the rear edges of the feeder plate slots 115 strike the fingers 163' thus rocking the lever 158 and, through the latter, throwing in the cut-off clutch 119, 120, thus throwing into action the strip severing and ejecting mechanism. A stop pin 168 on the lever arm 164 by striking against the lever 158 limits the inward movement of the fingers 163' under the pull of spring 165.

Figure 3:
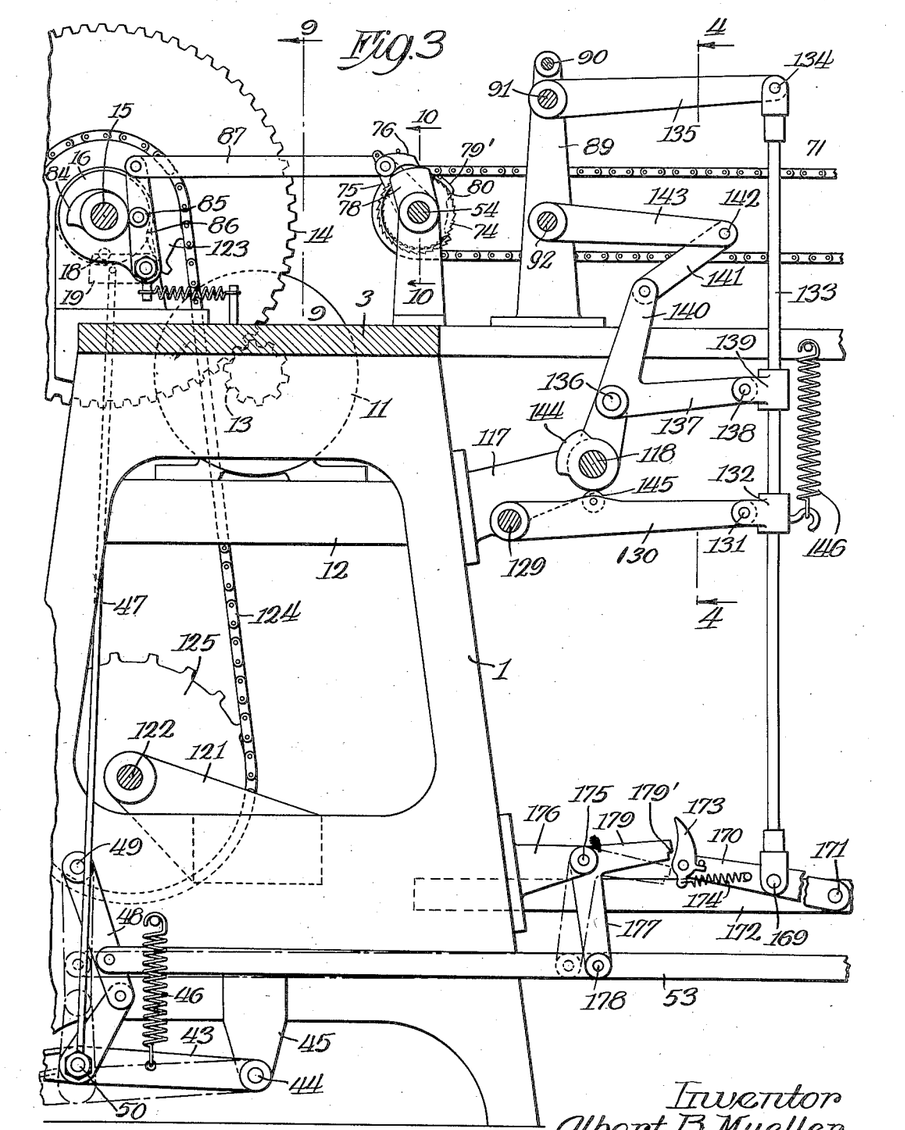
Fig. 3 is an enlarged vertical longitudinal section taken on the line 3—3 of Figs. 2 and 4.

Simultaneously with the opening or spreading movement of the cutter arms 95 and 96, which immediately follows the discharge of a filled section of upholstery material or piping from the machine, the entire operation of the machine is arrested until an empty section of piping has been applied, this stopping of the machine being automatically affected by the following described mechanism. Referring mainly to Figs. 1 and 3, the lower end of the rod 133 is pivotally connected at 169 to an arm 170, which arm is pivoted at 171 on a longitudinal brace bar 172 that connects the lower portion of the standards 1 and 2. On the free end of arm 170 is mounted a pawl 173, the tail of which is connected by a pull spring 174 to the arm 170 behind the pawl, so as to hold the pawl in position with a lug thereon engaging a stop pin on the arm 170. Pivoted at 175 to a bracket 176 attached to the standard 1 is a bell crank lever, the depending limb 177 of which is pivoted at 178 to the link 53. The horizontal arm 179 of the elbow lever is formed with a shoulder 179' on its free end that cooperates with the nose of the pawl 173. When the machine is started in operation by depressing the pedal lever 43 or pulling the hand lever 51, the link 53 is shifted to the left, viewing Figs. 1 and 3, and this swings the elbow lever 177, 179 to the dotted line position shown in Fig. 3. When the cutter arms 95 and 96 are swung inwardly, the rod 133 is depressed, and this carries the nose of the pawl 173 beneath the shoulder 179' of the elbow lever arm 179 and the spring 174 holds the nose against the end of the arm 179. Consequently, as soon as the cutter arms 95 and 96 are spread or opened by spring 146, the rising movement of the rod 133 trips the lever 177, 179 through the pawl 173 and thus breaks the toggle 48, and allows the spring 46 to open the main clutch and arrest the movement of the machine.

Briefly describing the connected operation of the machine, and assuming that the tubes are empty, a card is first introduced in the tube that is equipped with the fabric-controlled trip device to maintain the fingers 163' out of the tube, and the machine having been started in operation by depressing the pedal lever 43, or pulling the hand starting lever 51, the ends of the stuffing strips are then entered into the nip of the feed rolls, and the tubes are filled down to the transverse plane of the trip fingers 163'. The card is then withdrawn, allowing the trip device to be operated by the feeder plate and arrest the operation of the machine; this being effected by throwing in the clutch 119, 120, which causes the cam 144, acting through lever 130 and rod 133 to lower the pawl 173 into working engagement with shoulder 179', whereupon, as soon as the cam passes over its follower 145, the spring 146 raises the pawl 173 and, through lever 177, 179 and link 53, breaks the toggle 48 and throws out the main clutch 14', 16. The open end of a piping is then slid over the open ends of the tubes, the hand crank 73 is operated, and the chain hooks engage the piping and pull the pleats onto the tubes. During this operation the pleat engaging the tube that is equipped with the trip-out fingers 163' depresses the latter and holds them out of the tube. The machine is then restarted, and at first the feed of the piping is delayed while the stuffing strips are fed forward to the closed ends of the pipes. It may here be mentioned that both closed-end pipes and open-end pipes may be used on this machine. The feed regulator on shaft 54, shown in detail in Figs. 10 and 11, can be adjusted to so control the feed of the piping as to more or less pack the stuffing strips in the closed-end pipes, or, if an open-end piping is being filled, its feed is made to progress substantially at the same rate of speed as that of the stuffing strips. As the trailing end of the piping passes the fingers 163' of the trip device, the clutch 119, 120 is thrown in by the latter and the cut-off arms are first swung inwardly by cam 144 and then cam 151 operates the lower slider 97a, spreading the two sets of teeth and severing the strips, as shown in Fig. 16, the same stroke of the sliders 97, 97a pushing the loaded piping off the tubes. The spring 146 then functions through rod 133 and pawl 173 to throw out the main clutch, as previously described, and arrest the machine with the tubes charged with stuffing material. An empty piping section is then entered on the tubes, and the described cycle of operations is repeated.

Manifestly many of the details of the machine herein shown and described are not essential to the invention in its broad aspects, and may be variously modified or substituted by equivalent devices without involving any departure from the substance of the invention or sacrificing of its advantages. Hence, the invention is not to be understood as limited to the specific embodiment thereof herein set forth, but it is to be construed as broadly as the language of the appended claims and the prior art will permit.

I claim:

1. In a machine for stuffing upholstery piping, a plurality of tubes adapted to extend within the upholstery piping, means for compressing and feeding continuous stuffing strips into said tubes, reciprocating feed plates extending through the tubes for advancing the stuffing strips through and out of the tubes as the upholstery material is withdrawn therefrom, and means for severing the stuffing strips in the tubes while maintaining the latter charged with stuffing material.

2. In a machine for stuffing upholstery piping, a plurality of tubes over which the piping is drawn, means for feeding bats or strips of stuffing material into and through the tubes, and separate means for engaging and withdrawing the upholstery material as the latter is charged with stuffing material by said feeding means.

3. In a stuffing machine for upholstery piping, a plurality of tubes over which the piping is drawn, a reciprocating means extending substantially throughout the length of the tubes for feeding strips of stuffing through and out of the tubes as the upholstery material is withdrawn therefrom, a trip device arranged to be engaged by the piping on the tubes, and means controlled thereby for automatically stopping the machine.

4. In an upholstery stuffing machine, a plurality of tubes adapted to fit within the plaits of upholstery material, means for feeding strips of stuffing through and out of the tubes as the upholstery material is withdrawn therefrom, means for severing the strips, and means for successively throwing said severing means into operation and for arresting the operation of the machine.

5. In an upholstery stuffing machine, a plurality of tubes adapted to fit within the plaits of upholstery material, means for feeding strips of stuffing through and out of the tubes as the upholstery material is withdrawn therefrom, means for severing the strips, and means automatically controlled by the removal of the upholstery material for automatically throwing said severing means into operation.

6. In a machine for stuffing upholstery piping, a plurality of tubes over which the piping is drawn, means for feeding formed bats of stuffing material through and out of the tubes as the piping is withdrawn therefrom, and means for severing the bats at points within the tubes and adjacent the discharge ends thereof to thereby maintain the tubes charged with stuffing material.

7. In a machine for stuffing upholstery piping, a plurality of tubes over which the piping is drawn, means for feeding formed bats of stuffing material through and out of the tubes as the piping is withdrawn therefrom, means for severing the bats, means for arresting the machine with the tubes charged with stuffing material, and devices for automatically and variably tripping said bat-severing means and said arresting means into operation.

8. In a machine for stuffing upholstery piping, a plurality of tubes over which the piping is drawn, means for feeding formed bats of stuffing material through and out of the tubes as the piping is withdrawn therefrom, means for severing the bats into sections, and means controlled by the removal of the piping from the tubes for throwing the bat-severing means into operation and for arresting the operation of the strip-feeding means.

9. In a machine for stuffing upholstery piping, a plurality of tubes over which the piping is drawn, means for feeding stuffing strips through the tubes and into the piping as the latter is withdrawn from the tubes, means independent of said strip-feeding means for severing the strips, and mechanism for operating said strip feeding and severing means in timed relation.

10. In a stuffing machine for upholstery piping, a plurality of tubes, means for feeding strips of stuffing material through the tubes, and means for severing the strips into sections comprising pairs of devices and means for engaging said devices with the strips in the tubes and for separating the same to thereby sever the strips.

11. In a stuffing machine for upholstery piping, a plurality of tubes, means for feeding strips of stuffing material through the tubes, and means for severing the strips into sections comprising two sets of teeth disposed on opposite sides of the tubes, and means for engaging the sets of teeth with the strips in the tubes and for separating the same to sever the strips.

12. In a stuffing machine for upholstery piping, mechanism for feeding a plurality of stuffing strips into the plaits of the piping, mechanism for severing the strips into sections, separate clutches for throwing said mechanisms into and out of operation, and means for automatically opening the feed clutch and closing the severing clutch.

13. In a stuffing machine for upholstery piping, a plurality of tubes over which the piping is drawn, mechanism for feeding formed bats of stuffing material through and out of the tubes as the piping is withdrawn therefrom, mechanism for severing the bats, separate start-stop clutches for said mechanisms, and means controlled by the removal of the piping from the tubes for opening the feed clutch and closing the severing clutch.

14. In a stuffing machine for upholstery piping, a plurality of tubes over which the piping is drawn, mechanism for feeding formed bats of stuffing material through and out of the tubes as the piping is withdrawn therefrom, mechanism for severing the bats, means controlled by the removal of the piping from the tubes for throwing the severing mechanism into operation, and means actuated by said severing mechanism for stopping the operation of the machine.

15. In an upholstery stuffing machine, a pair of rollers for supporting and rotating a plurality of rolls of stuffing strips, means for spacing the rolls and for guiding the strips therefrom, and means for feeding the strips into the compartments or plaits of the upholstery material.

16. In a stuffing machine for upholstery piping, a plurality of tubes disposed side by side and over which the piping is drawn, two pairs of rollers disposed respectively above and below the inlet ends of the tubes and arranged to support and rotate rolls of stuffing strips, alternately disposed spacing and guiding devices for the rolls and strips, and means for feeding the strips into and through the tubes.

17. In a stuffing machine for upholstery piping, a plurality of tubes over which the piping is drawn, a pair of rollers for supporting and rotating a plurality of rolls of stuffing strips, guides for spacing, directing and compressing the strips, a pair of feed rolls for engaging and advancing the strips, and reciprocating feeders in said tubes for advancing the strips therethrough.

18. In a stuffing machine for upholstery piping, a plurality of open-ended but otherwise closed tubes arranged side by side and over which the piping is drawn, means for compressing, guiding and feeding a plurality of stuffing strips to said tubes, reciprocating toothed feeding plates ex- 156 to the lower end of a lever 158, hereinafter referred to, and a pull spring 159 anchored at one end to the link 157 and at its other end to the table 3. This clutch is thrown in to actuate the stuffing strip severing mechanism and then arrest the operation of the machine at a point in the operation of the machine when the pipes of the piping have been filled, and the filled piping is ready to be discharged from the tubes. The throwing in of this clutch is effected by the working stroke of one of the feeder plates 34 acting through a trip device that is controlled by the fabric forming the bottom wall of the piping and enters the path of movement of the feeder plate as soon as permitted by the open edge of the piping passing thereover. Describing this clutch throw-in device, the lever 158 is pivoted at 160 to a bracket 161 on the table 3, and pivoted at 162 on the upper end of lever 158 is an elbow lever, the horizontal limb of which comprises a pair of parallel arms 163 underlying the end portion of one of the tubes 29 and formed on their free ends with upstanding fingers 163' that register with the slots 114 and 115 in the bottom wall of the tube and the feeder plate respectively. To the lower depending arm 164 (Fig. 16) of the elbow lever is connected a pull spring 165 anchored at 166 to the outer end of a lateral arm 167 on the lever 158. The spring 165 urges the fingers 163' upwardly into the tube; but so long as the slots 114 are covered by the fabric, the fingers cannot enter the slots. As soon, however, as the open end of the piping has passed the fingers 163', the latter enters the slots 114 and 115, and on the next forward stroke of the feeder plate 34 the rear edges of the feeder plate slots 115 strike the fingers 163' thus rocking the lever 158 and, through the latter, throwing in the cut-off clutch 119, 120, thus throwing into action the strip severing and ejecting mechanism. A stop pin 168 on the lever arm 164 by striking against the lever 158 limits the inward movement of the fingers 163' under the pull of spring 165.

Simultaneously with the opening or spreading movement of the cutter arms 95 and 96, which immediately follows the discharge of a filled section of upholstery material or piping from the machine, the entire operation of the machine is arrested until an empty section of piping has been applied, this stopping of the machine being automatically affected by the following described mechanism. Referring mainly to Figs. 1 and 3, the lower end of the rod 133 is pivotally connected at 169 to an arm 170, which arm is pivoted at 171 on a longitudinal brace bar 172 that connects the lower portion of the standards 1 and 2. On the free end of arm 170 is mounted a pawl 173, the tail of which is connected by a pull spring 174 to the arm 170 behind the pawl, so as to hold the pawl in position with a lug thereon engaging a stop pin on the arm 170. Pivoted at 175 to a bracket 176 attached to the standard 1 is a bell crank lever, the depending limb 177 of which is pivoted at 178 to the link 53. The horizontal arm 179 of the elbow lever is formed with a shoulder 179' on its free end that cooperates with the nose of the pawl 173. When the machine is started in operation by depressing the pedal lever 43 or pulling the hand lever 51, the link 53 is shifted to the left, viewing Figs. 1 and 3, and this swings the elbow lever 177, 179 to the dotted line position shown in Fig. 3. When the cutter arms 95 and 96 are swung inwardly, the rod 133 is depressed, and this carries the nose of the pawl 173 beneath the shoulder 179' of the elbow lever arm 179 and the spring 174 holds the nose against the end of the arm 179. Consequently, as soon as the cutter arms 95 and 96 are spread or opened by spring 146, the rising movement of the rod 133 trips the lever 177, 179 through the pawl 173 and thus breaks the toggle 48, and allows the spring 46 to open the main clutch and arrest the movement of the machine.

Briefly describing the connected operation of the machine, and assuming that the tubes are empty, a card is first introduced in the tube that is equipped with the fabric-controlled trip device to maintain the fingers 163' out of the tube, and the machine having been started in operation by depressing the pedal lever 43, or pulling the hand starting lever 51, the ends of the stuffing strips are then entered into the nip of the feed rolls, and the tubes are filled down to the transverse plane of the trip fingers 163'. The card is then withdrawn, allowing the trip device to be operated by the feeder plate and arrest the operation of the machine; this being effected by throwing in the clutch 119, 120, which causes the cam 144, acting through lever 130 and rod 133 to lower the pawl 173 into working engagement with shoulder 179', whereupon, as soon as the cam passes over its follower 145, the spring 146 raises the pawl 173 and, through lever 177, 179 and link 53, breaks the toggle 48 and throws out the main clutch 14', 16. The open end of a piping is then slid over the open ends of the tubes, the hand crank 73 is operated, and the chain hooks engage the piping and pull the pleats onto the tubes. During this operation the pleat engaging the tube that is equipped with the trip-out fingers 163' depresses the latter and holds them out of the tube. The machine is then restarted, and at first the feed of the piping is delayed while the stuffing strips are fed forward to the closed ends of the pipes. It may here be mentioned that both closed-end pipes and open-end pipes may be used on this machine. The feed regulator on shaft 54, shown in detail in Figs. 10 and 11, can be adjusted to so control the feed of the piping as to more or less pack the stuffing strips in the closed-end pipes, or, if an open-end piping is being filled, its feed is made to progress substantially at the same rate of speed as that of the stuffing strips. As the trailing end of the piping passes the fingers 163' of the trip device, the clutch 119, 120 is thrown in by the latter and the cut-off arms are first swung inwardly by cam 144 and then cam 151 operates the lower slider 97a, spreading the two sets of teeth and severing the strips, as shown in Fig. 16, the same stroke of the sliders 97, 97a pushing the loaded piping off the tubes. The spring 146 then functions through rod 133 and pawl 173 to throw out the main clutch, as previously described, and arrest the machine with the tubes charged with stuffing material. An empty piping section is then entered on the tubes, and the described cycle of operations is repeated.

Manifestly many of the details of the machine herein shown and described are not essential to the invention in its broad aspects, and may be variously modified or substituted by equivalent devices without involving any departure from the substance of the invention or sacrificing of its advantages. Hence, the invention is not to be understood as limited to the specific embodiment thereof herein set forth, but it is to be construed as broadly as the language of the appended claims and the prior art will permit.

I claim:

1. In a machine for stuffing upholstery piping, a plurality of tubes adapted to extend within the upholstery piping, means for compressing and feeding continuous stuffing strips into said tubes, reciprocating feed plates extending through the tubes for advancing the stuffing strips through and out of the tubes as the upholstery material is withdrawn therefrom, and means for severing the stuffing strips in the tubes while maintaining the latter charged with stuffing material.

2. In a machine for stuffing upholstery piping, a plurality of tubes over which the piping is drawn, means for feeding bats or strips of stuffing material into and through the tubes, and separate means for engaging and withdrawing the upholstery material as the latter is charged with stuffing material by said feeding means.

3. In a stuffing machine for upholstery piping, a plurality of tubes over which the piping is drawn, a reciprocating means extending substantially throughout the length of the tubes for feeding strips of stuffing through and out of the tubes as the upholstery material is withdrawn therefrom, a trip device arranged to be engaged by the piping on the tubes, and means controlled thereby for automatically stopping the machine.

4. In an upholstery stuffing machine, a plurality of tubes adapted to fit within the plaits of upholstery material, means for feeding strips of stuffing through and out of the tubes as the upholstery material is withdrawn therefrom, means for severing the strips, and means for successively throwing said severing means into operation and for arresting the operation of the machine.

5. In an upholstery stuffing machine, a plurality of tubes adapted to fit within the plaits of upholstery material, means for feeding strips of stuffing through and out of the tubes as the upholstery material is withdrawn therefrom, means for severing the strips, and means automatically controlled by the removal of the upholstery material for automatically throwing said severing means into operation.

6. In a machine for stuffing upholstery piping, a plurality of tubes over which the piping is drawn, means for feeding formed bats of stuffing material through and out of the tubes as the piping is withdrawn therefrom, and means for severing the bats at points within the tubes and adjacent the discharge ends thereof to thereby maintain the tubes charged with stuffing material.

7. In a machine for stuffing upholstery piping, a plurality of tubes over which the piping is drawn, means for feeding formed bats of stuffing material through and out of the tubes as the piping is withdrawn therefrom, means for severing the bats, means for arresting the machine with the tubes charged with stuffing material, and devices for automatically and variably tripping said bat-severing means and said arresting means into operation.

8. In a machine for stuffing upholstery piping, a plurality of tubes over which the piping is drawn, means for feeding formed bats of stuffing material through and out of the tubes as the piping is withdrawn therefrom, means for severing the bats into sections, and means controlled by the removal of the piping from the tubes for throwing the bat-severing means into operation and for arresting the operation of the strip-feeding means.

9. In a machine for stuffing upholstery piping, a plurality of tubes over which the piping is drawn, means for feeding stuffing strips through the tubes and into the piping as the latter is withdrawn from the tubes, means independent of said strip-feeding means for severing the strips, and mechanism for operating said strip feeding and severing means in timed relation.

10. In a stuffing machine for upholstery piping, a plurality of tubes, means for feeding strips of stuffing material through the tubes, and means for severing the strips into sections comprising pairs of devices and means for engaging said devices with the strips in the tubes and for separating the same to thereby sever the strips.

11. In a stuffing machine for upholstery piping, a plurality of tubes, means for feeding strips of stuffing material through the tubes, and means for severing the strips into sections comprising two sets of teeth disposed on opposite sides of the tubes, and means for engaging the sets of teeth with the strips in the tubes and for separating the same to sever the strips.

12. In a stuffing machine for upholstery piping, mechanism for feeding a plurality of stuffing strips into the plaits of the piping, mechanism for severing the strips into sections, separate clutches for throwing said mechanisms into and out of operation, and means for automatically opening the feed clutch and closing the severing clutch.

13. In a stuffing machine for upholstery piping, a plurality of tubes over which the piping is drawn, mechanism for feeding formed bats of stuffing material through and out of the tubes as the piping is withdrawn therefrom, mechanism for severing the bats, separate start-stop clutches for said mechanisms, and means controlled by the removal of the piping from the tubes for opening the feed clutch and closing the severing clutch.

14. In a stuffing machine for upholstery piping, a plurality of tubes over which the piping is drawn, mechanism for feeding formed bats of stuffing material through and out of the tubes as the piping is withdrawn therefrom, mechanism for severing the bats, means controlled by the removal of the piping from the tubes for throwing the severing mechanism into operation, and means actuated by said severing mechanism for stopping the operation of the machine.

15. In an upholstery stuffing machine, a pair of rollers for supporting and rotating a plurality of rolls of stuffing strips, means for spacing the rolls and for guiding the strips therefrom, and means for feeding the strips into the compartments or plaits of the upholstery material.

16. In a stuffing machine for upholstery piping, a plurality of tubes disposed side by side and over which the piping is drawn, two pairs of rollers disposed respectively above and below the inlet ends of the tubes and arranged to support and rotate rolls of stuffing strips, alternately disposed spacing and guiding devices for the rolls and strips, and means for feeding the strips into and through the tubes.

17. In a stuffing machine for upholstery piping, a plurality of tubes over which the piping is drawn, a pair of rollers for supporting and rotating a plurality of rolls of stuffing strips, guides for spacing, directing and compressing the strips, a pair of feed rolls for engaging and advancing the strips, and reciprocating feeders in said tubes for advancing the strips therethrough.

18. In a stuffing machine for upholstery piping, a plurality of open-ended but otherwise closed tubes arranged side by side and over which the piping is drawn, means for compressing, guiding and feeding a plurality of stuffing strips to said tubes, reciprocating toothed feeding plates extending substantially throughout the lengths of said tubes for advancing the stuffing strips therethrough, and means for severing the strips at points located in the tubes and adjacent to the discharge ends thereof.

19. In a stuffing machine for upholstery piping, a plurality of tubes of oval cross section disposed side by side in a common plane, reciprocating toothed plates maintained within the tubes and in contact with the bottom walls thereof and having longitudinal slots, and the bottom walls of the tubes having teeth extending upwardly through said slots.

20. In a stuffing machine for upholstery piping, a plurality of sheet metal tubes of oval cross section and having closed side walls and open ends, said tubes being arranged side by side substantially in a common plane and adapted to fit within the plaits of the piping, a series of flat sheet metal feeding plates maintained within the tubes and in contact with the bottom walls thereof, said plates having longitudinal slots and inclined teeth struck up from the metal bodies thereof, and said tubes having inclined teeth struck up from the bottom walls thereof and projecting through the slots of said plates, and means for reciprocating said plates.

21. In a stuffing machine for upholstery piping, a plurality of tubes adapted to fit within the plaits of the piping, reciprocating feeders in said tubes for advancing stuffing strips therethrough, and separate feeding means for withdrawing the piping from said tubes as the stuffing strips are ejected therefrom.

22. In a stuffing machine for upholstery piping, a plurality of tubes adapted to fit within the plaits of the piping, reciprocating feeders in said tubes for advancing stuffing strips therethrough, and separate reversible feeding devices for engaging and drawing the piping onto the tubes and for withdrawing the same as the stuffing strips are discharged from the tubes.

23. In a stuffing machine for upholstery piping, a plurality of tubes adapted to fit within the plaits of the piping, reciprocating feeders in said tubes for advancing stuffing strips therethrough, separate reversible feeding devices for engaging the piping and manually operable to draw the piping onto the tubes, and mechanism for operating said feeders and feeding devices to eject the stuffing strips and withdraw the piping from the tubes.

24. In a stuffing machine for upholstery piping, a plurality of tubes adapted to fit within the plaits of the piping, reciprocating feeders in said tubes for advancing the stuffing strips therethrough, feeding devices for withdrawing the piping from the tubes as the stuffing strips are discharged therefrom, and actuating mechanism for said reciprocating feeders and said feeding devices arranged to effect a preliminary operation of the strip feeders in advance of the operation of said devices.

25. In a stuffing machine for upholstery piping, a plurality of tubes over which the piping is drawn, means for feeding formed bats of stuffing material through and out of said tubes, means for controlling the withdrawal of the piping from the tubes, means for severing the bats into sections, and actuating mechanism arranged to effect a preliminary operation of said bat feeding means in advance of the operation of the means for controlling the withdrawal of the piping.

26. In a stuffing machine for upholstery piping, a plurality of tubes over which the piping is drawn, reciprocating feeders in the tubes for advancing stuffing strips through and out of the tubes, conveyors for controlling the withdrawal of the piping from the tubes as the stuffing strips are discharged therefrom, means for severing the strips into sections, actuating mechanism for said feeders and conveyors, means for stopping and starting said mechanism, and means for preventing the operation of said conveyors, when said mechanism is started, until after a preliminary operation of said feeders.

27. In a stuffing machine for upholstery piping, a plurality of tubes over which the piping is drawn, reciprocating feeders in the tubes for advancing stuffing strips through and out of the tubes, reversible feeding conveyors manually operable to draw the piping onto the tubes, mechanism for actuating said feeders and conveyors to discharge the stuffing strips and withdraw the piping from the tubes, means for severing the strips in the tubes, means for effecting the operation of said severing means and for stopping said actuating mechanism, and means for preventing the operation of said conveyors, when said mechanism is again started, until after a preliminary operation of the feeders for the stuffing strips.

28. In a stuffing machine for upholstery piping, a plurality of tubes over which the piping is drawn, reciprocating feeders in the tubes for advancing stuffing strips through and out of the tubes, reversible conveying means for drawing the piping onto the tubes and for controlling the withdrawal therefrom, and means for shifting said conveying means into and out of operative position.

29. In a machine for stuffing upholstery piping, a plurality of tubes, means for feeding formed bats of stuffing material through the tubes and into the upholstery piping, other means for engaging and advancing the upholstery piping as the latter is charged with stuffing material by said feeding means, means for severing the bats of stuffing material into sections and mechanism for operating the feeding means for the bats and upholstery piping and the bat severing means in time relation.

30. A stuffing machine for pleated upholstery having in combination a plurality of tubes arranged to extend within the upholstery pleats and provided with feeding means effective to charge the tubes with formed bats of stuffing material and simultaneously advance the same into the pleats of the upholstery as the latter is withdrawn from the tubes, devices for severing the bats into sections, and means for automatically and variably throwing said bat-severing devices into operation.

31. A stuffing machine for pleated upholstery having in combination a plurality of tubes arranged to extend within the upholstery pleats and provided with feeding means effective to charge the tubes with formed bats of stuffing material and simultaneously advance the same into the pleats of the upholstery as the latter is withdrawn from the tubes, supplemental feeding means for controlling the withdrawal of the upholstery material and mechanism for variably actuating said supplemental feeding means relative to the operation of the bat feeding means.

32. A stuffing machine for pleated upholstery having in combination a plurality of tubes arranged to extend within the pleats and provided with feeders for advancing formed bats of stuffing material through the tubes and into the pleats of the upholstery, conveyor means engaging and controlling the withdrawal of the upholstery material as the same is charged with stuffing material by said feeders, and actuating mechanism for the feeders and conveyor means arranged to retard the operation of the conveyor means during a preliminary operation of the feeders.

33. A stuffing machine for pleated upholstery having in combination a plurality of tubes arranged to extend within the pleats and provided with feeders for advancing formed bats of stuffing material through the tubes and into the pleats of the uphostery, conveyor means engaging and controlling the withdrawal of the upholstery material as the same is charged with stuffing material by said feeders, actuating mechanism for said bat feeders, and supplemental actuating mechanism for said conveyor means provided with adjusting devices for variably retarding the initial operation of the conveyor means and for varying the rate of operation thereof relative to the rate of operation of the bat feeders.

34. In a stuffing machine for upholstery piping, a plurality of tubes provided with reciprocating feeding devices having forwardly inclined teeth for advancing the strips of stuffing material through the tubes and means for severing the strips into sections comprising pairs of devices and actuating mechanism for engaging said devices with the strips in the tubes and for moving one of the devices of each pair forwardly to thereby sever the strips.

35. In an upholstery machine, a pair of rollers for supporting and rotating a plurality of rolls of stuffing strips, means for feeding the strips delivered from the rolls, and guides extending over the rollers for spacing the rolls of strips and for directing the strips to the feeding devices.

36. In a stuffing machine for upholstery piping, a plurality of tubes arranged to extend within the pleats of the upholstery material, and provided with reciprocating toothed feeders for advancing strips of stuffing material therethrough and into the pleats of upholstery material as the latter are withdrawn from the tubes, a sectional operating shaft for said feeders and individual supports for the tubes and the sections of said shaft.

37. A stuffing machine for pleated upholstering having in combination a plurality of tubes arranged to extend within the upholstery pleats and provided with feeding means effective to charge the tube with formed bats of stuffing material and simultaneously advance the same into the pleats of the upholstery as the latter are withdrawn therefrom, means for severing the strips into sections, means for arresting the machine with the tubes charged with stuffing material, and devices for automatically and variably tripping said bat-severing means and said arresting means into operation.

ALBERT B. MUELLER.